United States Patent

Ward

[11] Patent Number: 4,759,788
[45] Date of Patent: Jul. 26, 1988

[54] HEAT STRENGTHENED GLASS

[75] Inventor: Peter Ward, Garswood, England

[73] Assignee: Pilkington Brothers P.L.C., St. Helens, England

[21] Appl. No.: 66,472

[22] Filed: Jun. 26, 1987

[30] Foreign Application Priority Data

Jun. 26, 1986 [GB] United Kingdom ............... 8615678

[51] Int. Cl.[4] ............................................. C03B 27/04
[52] U.S. Cl. .......................................... 65/114; 65/104; 65/245; 65/253; 65/273; 65/348; 29/121.1; 29/121.4; 29/124; 29/127
[58] Field of Search ................. 65/273, 245, 253, 104, 65/106, 107, 348, 114; 29/121.4, 121.7, 121.1, 121.2, 124, 127

[56] References Cited

U.S. PATENT DOCUMENTS

| 2,725,974 | 12/1955 | Shields | 29/121.7 X |
| 3,396,000 | 8/1968 | Carson et al. | 65/273 X |
| 3,963,469 | 6/1976 | Pierre | 65/351 X |
| 4,226,608 | 10/1980 | McKelvey | 65/245 X |
| 4,363,163 | 12/1982 | McMaster | 65/351 X |

Primary Examiner—Arthur Kellogg
Attorney, Agent, or Firm—Burns, Doane, Swecker & Mathis

[57] ABSTRACT

A method of producing heat strengthened glass in which the glass is heated to a temperature above its strain point and is then cooled while horizontally supported. Discontinuous support is provided for the glass as it is cooled by intermittent regional contact with the lower surface of the glass, whereby any pattern of iridescence resulting from heat transfer between the lower glass surface and the support is free of prominent continuous features. A glass treatment furnace for producing heat strengthened glass, has horizontal glass-supporting rollers and cooling-flow supply means in the vicinity of those rollers, the bearing surface of each roller comprising discontinuous bearing elements which provide intermittent regional support contact with the lower surface of the glass.

17 Claims, 1 Drawing Sheet

HEAT STRENGTHENED GLASS

BACKGROUND TO THE INVENTION

This invention relates to heat strengthened glass and in particular to a method and apparatus for manufacturing heat strengthened glass panels for incorporation in a fully-glazed facade of a building.

It is desirable that such glass panels should be stronger than annealed glass so as to be capable of resisting stresses to which the panels may be subjected during glazing, and due to wind load when in situ. However the panels should not be heat treated to a degree such that thermally induced stresses in the glass are at a level which could cause dicing of the glass upon inadvertent fracture.

Glass sheets which satisfy this requirement as known as "heat strengthened glass" which is defined in U.S. Federal Spec. No. DD-G-14O3D, dated August 15, 1972 as glass having a surface compression of not less than 3,500 p.s.i. (24 MN/m$^2$) or greater than 10,000 p.s.i. (69 MN/m$^2$) or an edge compression of less than 5,500 p.s.i. (38 MN/m$^2$).

The permissible upper limit of stress is dependent on the thickness of the glass and it has been found that the thicker the glass the lower is the value of the stresses in the glass which may cause dicing when the glass is fractured. Thus thicker heat strengthened glass, for example about 12 mm thick, may have compression stresses somewhat lower than those indicated above, while thinner heat strengthened glasses may have compression stresses somewhat higher than those indicated above.

It has been usual to produce heat strengthened glass sheets, for architectural use, on a roller furnace in which the glass is heated to a temperature above its strain point and is then cooled while it is horizontally supported. Usually this cooling is carried out by indexing the glass sheet to and fro on horizontal rollers while subjecting the glass surfaces to cooling flows, which are usually cooling air flows which are directed towards the upper and lower glass surfaces.

In order to allow flows of cooling air between the glass surface and the rollers, it has been usual to employ rollers which do not contact the lower surface of the glass along the whole length of the rollers.

Such rollers which have been employed are "donut" rollers having a spaced series of ceramic tires which provide the roller support, or rollers which are wound helically with thermally insulating tape of refractory fibre material. Both the tires and the helical windings provide bearing surfaces which are continuous across the region of contact between the roller and the glass.

The Applicant is aware of GB No. 1240502 and U.S. Pat. No. 2,130,282 (Drake), the latter specification corresponding to GB No. 472516. GB No. 1240502 describes a process in which glass is cooled by streams of gas issuing through horizontal rollers which provide a continuous supporting surface for the glass (although at high gas flow rates, the gas pressure may be sufficient to support the glass above the rollers). U.S. Pat. No. 2,140,282 describes a toughening furnace in which the glass is supported on horizontal rollers and then withdrawn over "donut" rollers of the kind referred to above; these "donut" rollers have support surfaces which are continuous around the periphery of the roller tires.

These specifications are primarily concerned with the production of strengthened glass. When the glass is cooled to toughen it, heat transfer takes place predominantly between the cooling medium (usually air) and the glass, and heat transfer between the glass and supporting rollers is not so significant.

When manufacturing heat strengthened thick glass, particularly in thickness of 6 mm or more, for example about 10 mm thick, the level of stress to be induced in the glass predicates a low rate of heat exchange with the glass surfaces during cooling. The thicker the glass, the lower the rate of cooling, and the heat transfer from the lower glass surface by conduction through the roller contact is then at a rate commensurate with heat transfer from the glass due to the overall cooling of exposed parts of the glass surface between the rollers. Thus the heat transfer between the glass and the supporting roller surfaces becomes significant and leads to patterns of iridescence in the glass. Patterns of iridescence induced in the glass, which are visible in polarised light, have been found to include prominent continuous band or trellis-like features which would be visible to the eye when the panels are glazed in a building. Such patterns are unacceptable, and are emphasised when the glass has been coated after its heat treatment, because the presence of a light reflecting coating on the glass can enhance the obtrusive nature of such iridescent patterns.

It is a main object of this invention to provide a solution to this problem which results in heat strengthened glass panels for architectural use in which any such patterns of iridescence are of a random or discontinuous nature, and are unobtrusive, being no worse than the kind of iridescent patterns which are usually observed in thermally toughened glass.

SUMMARY OF THE INVENTION

According to the invention there is provided a method of producing heat strengthened glass in which the glass is heated to a temperature above its strain point and is then cooled while horizontally supported, there being provided discontinuous support for the glass as it is cooled by intermittent regional contact with the lower surface of the glass, whereby any pattern of iridescence resulting from heat transfer between the lower glass surface and the support is free of prominent continuous features.

In a preferred method the glass is supported on horizontal rollers having discontinuous bearing surfaces which provide said intermittent regional contact with the lower surface of the glass.

Preferably the discontinuous bearing surfaces are of thermally insulating material.

The method of the invention may include applying a light reflecting coating to the glass before or after heat strengthening.

The invention also comprehends a glass treatment furnace for producing heat strengthened glass, having horizontal glass-supporting rollers and cooling-flow supply means in the vicinity of those rollers, wherein the bearing surface of each roller comprises discontinuous bearing elements which provide intermittent regional support contact with the lower surface of the glass.

Preferably the discontinuous bearing elements have bearing surfaces of thermally insulating material.

The discontinuous bearing elements may be arranged spirally around the roller.

In another embodiment the discontinuous bearing elements may be arranged randomly on the roller.

In yet another embodiment the bearing elements are parts of castellated tires. The castellated tires may be angularly staggered around the roller.

Each bearing element may have a maximum linear dimension of 80 mm.

BRIEF DESCRIPTION OF THE DRAWINGS

Some embodiments of the invention are now described, by way of example, with reference to the accompanying drawings in which.

DETAILED DESCRIPTION OF THE PREFERRED EMBODIMENTS

Figure 1:
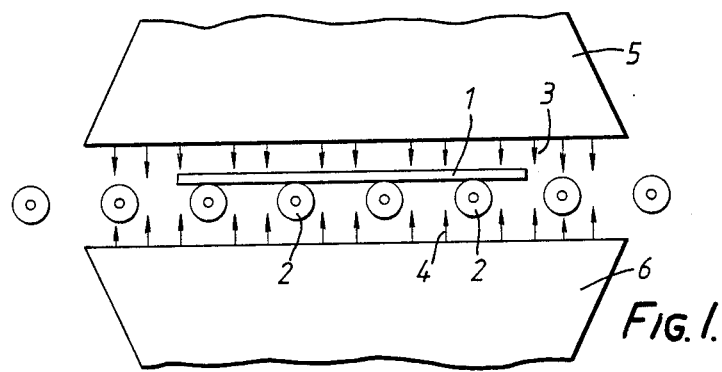
FIG. 1 is a diagrammatic side elevation through the cooling station of a glass treatment furnace according to the invention.

The cooling station of a glass treatment furnace for producing heat strengthened glass panels is illustrated diagrammatically in FIG. 1. A glass sheet 1 is heated to a temperature above its strain point, for example about 600° C. while supported on horizontal rollers and then the hot glass sheet is transported on horizontal rollers to a cooling station shown in FIG. 1. At the cooling station the hot sheet 1 is supported on horizontal rollers 2 which are, for example, spaced about 120 mm apart, and the glass is cooled by air flows 3 and 4 which are directed from upper and lower cooling-air supply hoods 5 and 6 mounted in the vicinity of the rollers 2. The air flows 3 and 4 may be directed towards the upper and lower surfaces of the glass sheet 1 by nozzles or through perforated plates which form a part of the supply means.

The hot glass sheet 1 is indexed to and fro in known manner through the air flows for a period of time, for example 4 minutes for 10 mm glass, sufficient to induce the required stresses in the glass. After the glass has been cooled below its strain point it is cooled by higher pressure air flows for a further period for example 5 minutes, sufficient to reduce its temperature to handling temperature.

In order to avoid the production of an undesirable polarization pattern in the glass, the horizontal rollers 2 which support the glass while it is cooled are designed, according to the invention, to provide discontinuous support for the glass by intermittent regional contact with the lower surface of the glass. To this end the bearing surface of each of the rollers 2 comprises discontinuous bearing elements which provide intermittent regional contact with the lower surface of the glass.

Figure 2:
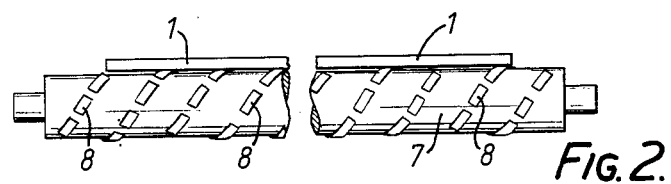
FIG. 2 is a view illustrating one form of glass supporting roller for use in the cooling station of FIG. 1.

One embodiment of each of the supporting rollers 2 is illustrated in FIG. 2. The main body 7 of the roller is a conventional mild steel roller of cylindrical form, and discontinuous bearing elements 8 are adhered to the roller surface. The bearing elements 8 are arranged spirally around the roller 7, at spaced intervals along one or more spiral paths.

This supporting roller was produced by winding a glass fibre tape approximately 25 mm wide spirally around the roller 7, using adhesive.

The spiral winding was then severed at periodic locations and severed portions removed so as to leave the discontinuous array of bearing elements 8 each approximately 25 mm × 30 mm and having a linear dimension of about 40 mm. The maximum linear dimension of the bearing elements may be about 80 mm. Preferably the bearing elements are less than 50 mm long. The elements 8 provide intermittent regional support contact with the lower surface of the glass sheet. For a more durable support, a tape of refractory fibre sold under the trade mark "Kevlar" may be used in place of the glass fibre tape. The tape provides a discontinuous thermally insulating bearing surface on the roller.

This roller form ensures that conductive heat transfer away from every supported region of the lower glass surface, during the indexing of the glass sheet 1 on the rollers 2, occurs only over separated regions of the glass surface during cooling of that surface by the upward cooling air flows 4. The pattern of iridescence which could be observed in the heat strengthened glass panel was of a distributed appearance without prominent continuous features, for example lines, such as would induce the eye to observe the existence of that pattern. The appearance of the processed heat strengthened glass panel was acceptable even when the glass sheet had been coated with a light reflecting coating, for example of sputtered metal. The light reflecting coating could be applied to the glass before heat strengthening if the coating was sufficiently durable to withstand the heat strengthening process, or after heat strengthening.

A glass sheet 10 mm thick and 1200 mm square was processed by this method using flows of cooling air at a pressure of about 2.5 Pa (0.01 inch water gauge) for 4 minutes. The sheet was then subjected to higher pressure cooling for about 5 minutes. The resulting heat strengthened glass sheets had an edge compression greater than 40 MPa and a centre tension in the range 20 MPa to 25 MPa. This sheet did not dice on fracture, and if fractured in situ in a building would break into pieces sufficiently large to be retained by a glazing frame in which it was clamped. The increased strength of the glass sheet provided effective resistance to wind loading.

Thinner sheets of heat processed glass have somewhat higher stresses. For example, samples of 6 mm glass produced by the method of the invention had a surface edge compression of about 55 MPa and a centre tension of 25 MPa to 30 MPa. Sample glass sheets 4 mm thick had a surface/edge compression of about 55 MPa and a centre tension of about 25 MPa, although dicing fracture does not occur until the centre tension is about 43 MPa.

The discontinuous bearing elements 8 of FIG. 2 may be arranged in a random distribution on the roller 7 in a manner which does not detract from effective support contact for indexing the glass sheet, between the cooling air flows 3 and 4.

Another effective form of each roller 2 is with a moulded ceramic sleeve having a moulded distribution of raised bearing elements which intermittently contact the lower surface of the glass sheet as it is indexed to and fro.

Figure 3:
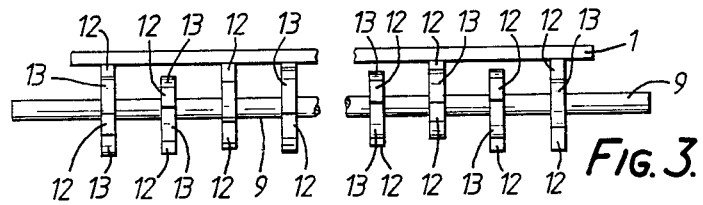
FIG. 3 is a similar view to FIG. 2 of another roller form.

A further roller construction is illustrated in FIG. 3, which is an adaptation according to the invention of a convention "donut" roller having a central spindle 9 and a spaced series of wheels 10 with tires 11 of reinforced ceramic fibre in a matrix.

Figure 4:
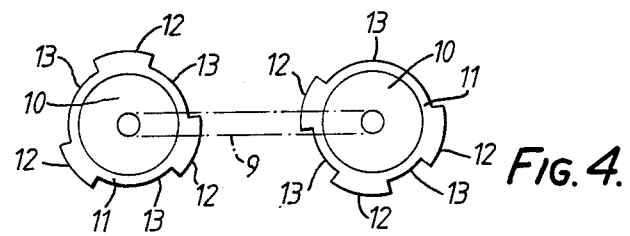
FIG. 4 illustrates diagrammatically two staggered ceramic tires of the roller of FIG. 3.

Each tire has a castellated bearing surface, providing three bearing elements 12, each providing a bearing land about 25 mm long, on each tire, separated by machined depressions 13. The bearing lands 12 need not be equiangularly spaced around the tires, and the castellated tires 11 are angularly staggered in random manner around the spindle 9, as indicated in FIG. 4, so that the bearing lands 12 of all the tires 11 of the roller together provide random, discontinuous support for the glass sheet with intermittent regional contact with the lower surface of the glass.

Each of these horizontal roller constructions according to the invention provides bearing surfaces which are not continuous in any direction over the region of contact between the glass surface and the roller. This ensures that overall uniform heat transfer from the lower surface of the glass is disturbed only over discrete separated regions, thereby producing as a new product heat strengthened glass panels having a visually unobtrusive pattern of iridescence which is acceptable in heat strengthened glass panels for glazing in a facade of a building.

I claim:

1. A method of producing heat strengthened glass in which the glass is heated to a temperature above its strain point and is then cooled while horizontally supported, there being provided discontinuous support for the glass as it is cooled by intermittent regional contact with the lower surface of the glass, whereby any pattern of iridescence resulting from heat transfer between the lower glass surface and the support is free of prominent continuous features.

2. A method as claimed in claim 1, in which the glass is supported on horizontal rollers having discontinuous bearing surfaces which provide said intermittent regional contact with the lower surface of the glass.

3. A method as claimed in claim 2, wherein the discontinuous bearing surfaces are of thermally insulating material.

4. A method as claimed in claim 1, including applying a light reflecting coating to the glass before or after heat strengthening.

5. A method as claimed in claim 2, including applying a light reflecting coating to the glass before or after heat strengthening.

6. A method as claimed in claim 3, including applying a light reflecting coating to the glass before or after heat strengthening.

7. A glass treatment furnace for producing heat strengthened glass, having horizontal glass-supporting rollers and cooling-flow supply means in the vicinity of those rollers, wherein the bearing surface of each roller comprises discontinuous bearing elements which provide intermittent regional support contact with the lower surface of the glass.

8. A furnace as claimed in claim 7, wherein the discontinuous bearing elements have bearing surfaces of thermally insulating material.

9. A furnace as claimed in claim 7, wherein the discontinuous bearing elements are arranged spirally around the roller.

10. A furnace as claimed in claim 8, wherein the discontinuous bearing elements are arranged spirally around the roller.

11. A furnace as claimed in claim 7, wherein the discontinuous bearing elements are arranged randomly on the roller.

12. A furnace as claimed in claim 8, wherein the discontinuous bearing elements are arranged randomly on the roller.

13. A furnace as claimed in claim 7, wherein the bearing elements are parts of castellated ceramic tires.

14. A furnace as claimed in claim 13 wherein the castellated tires are angularly staggered around the roller.

15. A furnace as claimed in claim 8, wherein the bearing elements are parts of castellated ceramic tires.

16. A furnace as claimed in claim 15 wherein the castellated tires are angularly staggered around the roller.

17. A furnace as claimed in claim 7, wherein each bearing element has a maximum linear dimension of 80 mm.

* * * * *